United States Patent [19]
Hacker et al.
[11] 4,179,023
[45] Dec. 18, 1979

[54] APPARATUS FOR DISTRIBUTING SOLIDS IN GRANULAR OR LUMP FORM

[75] Inventors: Hermann Hacker; Waldemar Zehenthofer, both of Zeltweg, Austria

[73] Assignee: Vereinigte Oesterreichische Eisen- und Stahlwerke-Alpine Montan Aktiengesellschaft, Vienna, Austria

[21] Appl. No.: 814,126

[22] Filed: Jul. 8, 1977

[30] Foreign Application Priority Data

Jul. 6, 1976 [AT] Austria .................................. 4932/76

[51] Int. Cl.2 .................................................. B65G 41/02

[52] U.S. Cl. ..................................... 198/631; 198/750; 267/139

[58] Field of Search ............... 198/535, 536, 574, 588, 198/594, 631, 750, 760, 767; 267/33, 65 B, 139; 104/249, 254, 256

[56] References Cited

U.S. PATENT DOCUMENTS

| | | | |
|---|---|---|---|
| 2,878,012 | 3/1959 | Crites | 267/34 |
| 3,151,856 | 10/1964 | Bresk et al. | 267/64 A |
| 3,184,037 | 5/1965 | Greaves et al. | 198/631 |
| 3,929,219 | 12/1975 | Malcolm | 198/574 |

*Primary Examiner*—Jeffrey V. Nase
*Attorney, Agent, or Firm*—Cushman, Darby & Cushman

[57] ABSTRACT

In apparatus for distributing solids in granular or lump form over an area of defined width comprising a wheeled carriage which is reciprocal between two end positions along a path which corresponds to said width, said carriage carrying a longitudinally extending endless conveyor which is charged with the solids to be distributed and which has a discharge end that moves above said width during movement of said carriage, the improvement which comprises an elastically deformable energy storage and release device for limiting the movement of the carriage at each end of the path of movement of the carriage thereby absorbing energy from the carriage and for thereafter transferring energy back to the carriage to move the latter in an opposite direction, the device in its deformed position defining the respective end position of the carriage.

11 Claims, 3 Drawing Figures

APPARATUS FOR DISTRIBUTING SOLIDS IN GRANULAR OR LUMP FORM

This invention relates to apparatus for distributing solids in granular or lump form across an area of defined width, comprising a wheeled carriage, which is reciprocable between two end positions along a path which corresponds to said width and carries a longitudinally conveying belt conveyor, which is charged with the solids to be distributed and which has a discharge end that moves above said area. Such apparatus is used, e.g., to distribute various solids to be sintered on a sintering machine conveyor across the width of the latter conveyor. In that case, the carriage provided with the distributing belt conveyor is reciprocating transversely to the longitudinal direction of the sintering machine conveyor and the discharge end of the carriage or of the belt conveyor mounted thereon moves throughout the width of the sintering machine conveyor. In previous arrangements of that kind, the carriage has been braked in its end positions and has subsequently been accelerated in the opposite direction. This operation results in a heavy wear of brakes and clutches so that frequent standstills had to be tolerated.

It is an object of the invention to eliminate this disadvantage. The invention resides essentially in that the movement of the carriage is limited at both ends by elastic energy storage devices, which consist of buffers, which are displaceable in guides against the force of spring means, which in their deformed positions define the two end positions of the carriage. Because these elastic buffers are provided, brakes are no longer required or, at least, the braking power can be minimized because the energy stored in the elastic buffers accelerates the carriage in the respective other direction, so that a considerable part of the driving power is also saved. It is apparent that an advantage afforded by the apparatus according to the invention resides in that the wear is greatly reduced and power is saved. The extent to which the buffers are elastically deformed is suitably selected so that the compressed spring reliably takes up the kinetic energy of the wheeled carriage and that the energy of the compressed spring results in an exertion of force on the carriage to move the same in the opposite direction. For instance, the buffers may be elastically deformed to an extent which is at least 1/25 and preferably at least 1/20 of the width over which the solids are to be distributed. This results in a reversion of movement substantially without shock and ensures that a considerable part of the energy stored by the buffers is transferred back to the carriage.

An economical operation involving low stresses will be obtained if the traversing drive motor is de-energized at the beginning of the deformation of the buffers and is re-energized for the traverse in the opposite direction slightly before the end of the deformation. In accordance with the invention the arrangement is such that the elastic energy storage devices are mounted on stationary buffer stops and cooperate with buffers mounted on the carriage.

The stationary buffers may simply cooperate with inelastic buffers of the carriage. This results in a more favorable design. Alternatively, the buffers on the carriage as well as the stationary buffers may be elastic.

Because the elastic buffers are displaceable against the force of spring means in guides, which are mounted in buffer stops, and, in a preferred embodiment of the invention, both ends of a buffer are connected to the guide by folding bellows, the interior spaces of which communicate with each other, an advantage is afforded which resides in that an increase of dust into the guides is avoided so that the wear is minimized. The two folding bellows suitably have approximately the same diameter so that the pressure of the enclosed volume of air is neither increased nor decreased and an ingress of dust-containing air need not be feared even in case of a leakage at one of the folding bellows. It will be particularly desirable so to design the apparatus according to the invention that that end of the buffer which cooperates with the carriage is formed by a tube, which has air passage holes and which is guided in a tubular guide and carries a buffer plate and at its end remote from the buffer plate is connected by a rod to an end plate of the second folding bellows, whereas the spring means consist preferably of a coil spring.

An illustrative embodiment of the invention is diagrammatically shown on the drawing.

Figure 1:
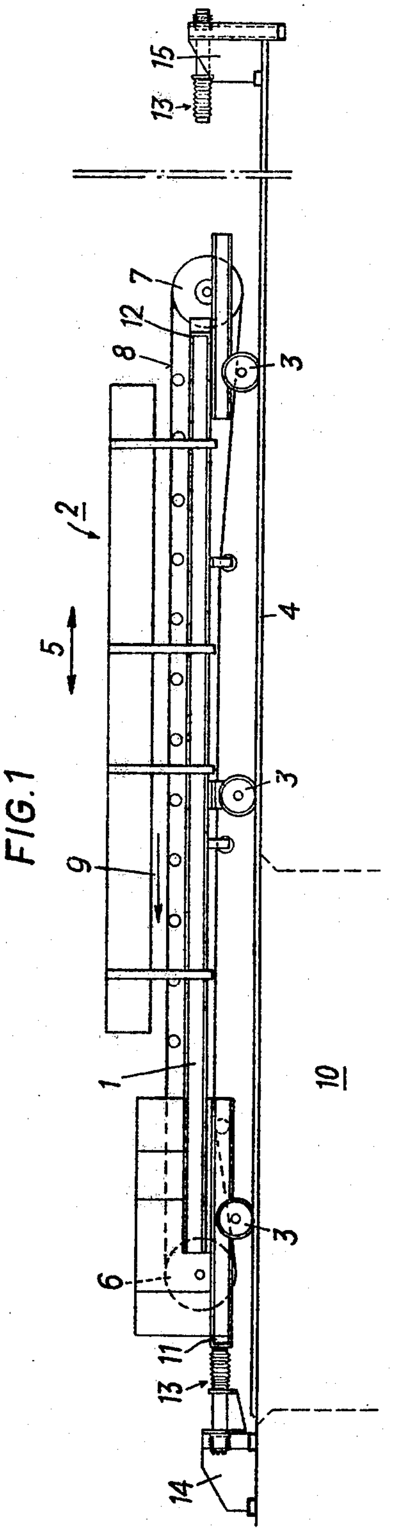
FIGS. 1 and 2 show apparatus according to the invention in FIG. 1 in a side elevation and in FIG. 2 in a top plan view.
Figure 2:
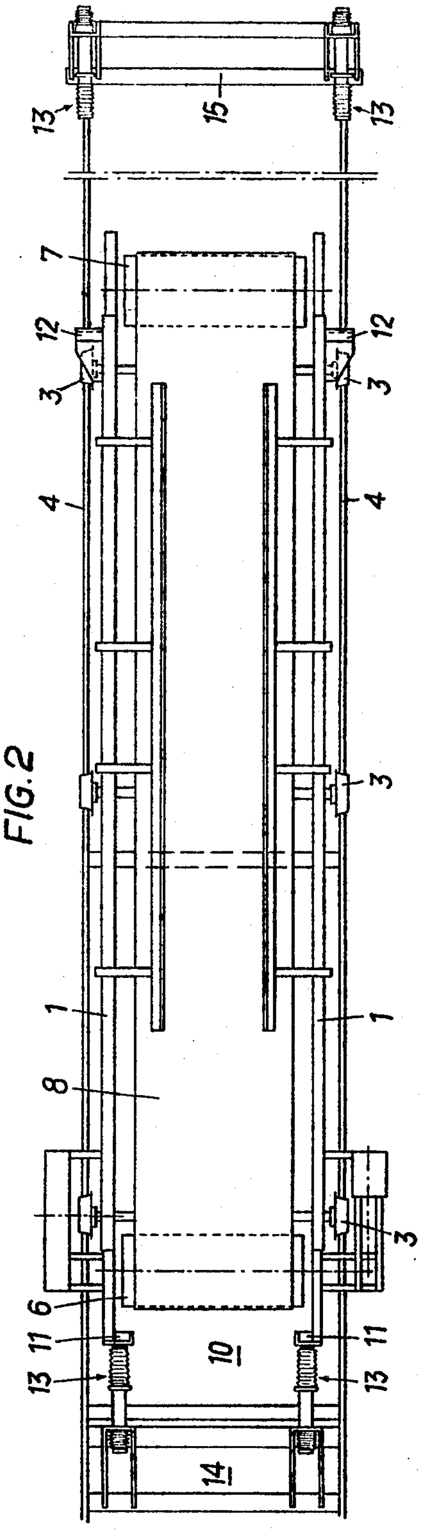

A carriage 2 has a frame 1 and wheels 3, on which the car 2 is movable along rails 4 in the direction of the arrow 5. A belt conveyor 8 is mounted on the frame 1 and has a belt that is trained around pulleys 6 and 7 and is guided toward the pulley 6 in the direction of the arrow 9. At least one bin, not shown, or a transfer chute, is disposed above the belt conveyor 8 and used to charge the latter with the solids in granular or lump form which are to be distributed. A discharge chute 10 is disposed below the carriage. That end of the belt conveyor belt 8 where its belt is trained around the pulley 6 is reciprocated over the chute 10, through which the solids are charged onto a sintering machine conveyor or the like. Inelastic buffers 11 are mounted directly on that end of the frame which is adjacent to the discharge end of the belt conveyor. Inelastic buffers 12 are mounted laterally of the frame 1 on the opposite end, which carries the pulley 7. These buffers 11 and 12 cooperate with elastic buffers 13, which are mounted on stationary buffer stops 14 and 15, respectively.

Figure 3:
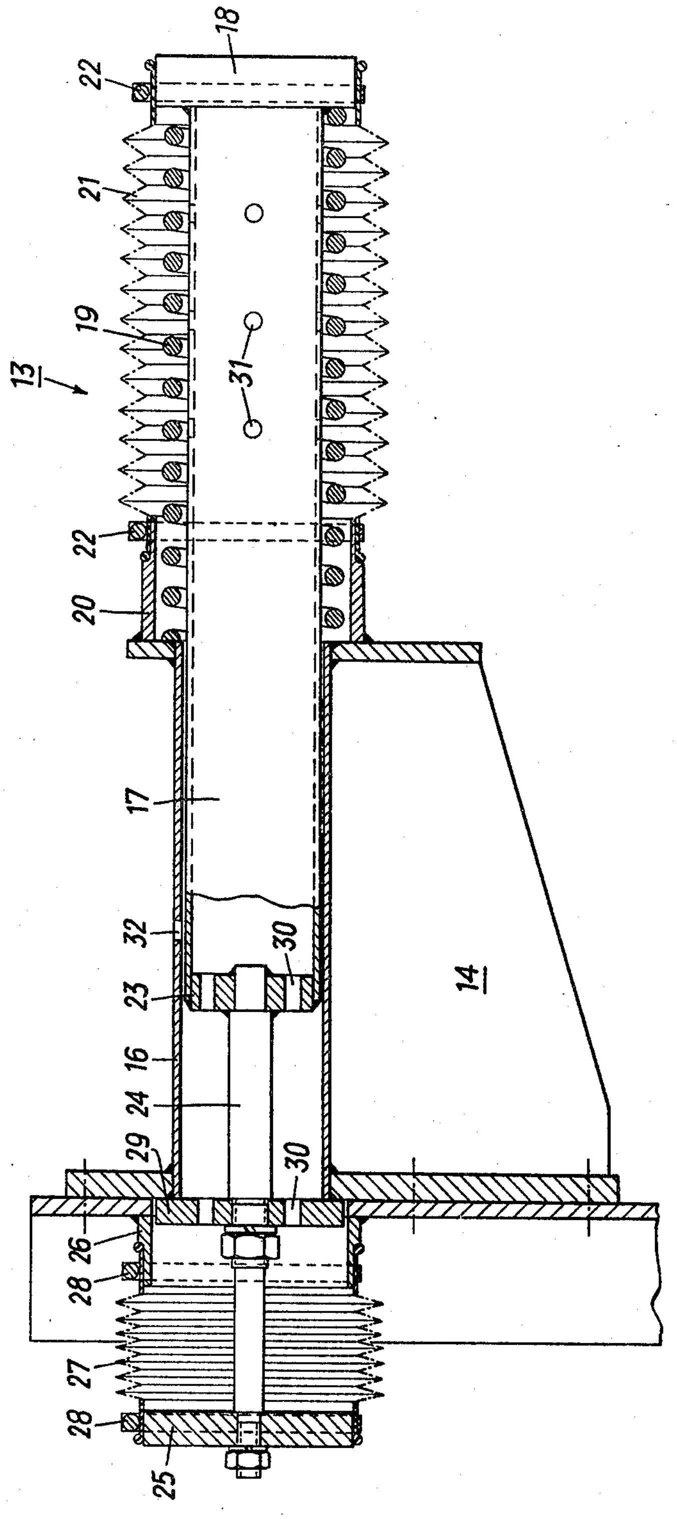
FIG. 3 is a view showing on an enlarged scale an elastic buffer, partly in transverse section.

These elastic buffers are shown on a larger scale in FIG. 3.

A tube 17 is slidably guided in a guide tube 16, which is welded to the buffer stop 14. The tube 17 carries at its end a buffer plate 18. A compressively stressed coil spring 19 is disposed between the buffer plate 18 and the buffer stop 14. A socket 20 is welded to the buffer stop 14, and folding bellows 21 are disposed between the socket 20 and the buffer plate 18, and are connected at opposite ends to the socket 20 and the buffer plate 18 by tightening straps 22. The bellows surround the spring 19 and define an air-tightly enclosed chamber which contains that spring. A plate 23 is welded into the other end of the tube 17 and carries a rod 24, to the end of which an end plate 25 is screw-threadedly fixed. Second folding bellows 27 are connected by tightening straps 28 to that end plate 25 and to a socket 26, which is welded to the buffer stop 14, so that end is also air-tightly closed. The rod 24 carries a stop 29, which limits the relaxation movement of the spring 19.

The stop plate 29 and the plate 23 have air passage holes 30, and the tube 17 has holes 31 too, so that the chambers enclosed by the folding bellows 21 and 27 communicate with each other and air can be exchanged between these chambers. Because the folding bellows 21 and 27 are equal in diameter, the deformation of the elastic buffer 13 will not result in a super-atmospheric or subatmospheric pressure so that an ingress of dust-laden air into the interior of these folding bellows is avoided.

The elastic buffers 13 at the other end of the carriage 2 are similarly connected to the buffer stops 15.

Bores for lubricating nipples are designated 32.

We claim:

1. Apparatus for distributing solids in granular or lump form over an area of defined width, comprising a wheeled carriage, which is reciprocable between two end positions along a path which corresponds to said width, said carriage carrying a longitudinally conveying belt conveyor which is charged with the solids to be distributed and has a discharge end that is moved above said width, the movement of the carriage being limited at both ends by elastic energy storage devices which elastically receive and store the kinetic energy of the wheeled carriage in one direction of movement and which subsequently transfer energy back to the carriage to move the latter in the opposite direction, said storage devices including buffers which are displaceable in guides against the force of spring means, which in their deformed positions define the end positions of the carriage.

2. Apparatus according to claim 1, characterized in that the elastic energy storage devices are mounted on stationary buffer stops and cooperate with buffers on the carriage.

3. Apparatus according to claim 1 characterized in that both ends of the buffer are connected to the guide by folding bellows and the interiors of both folding bellows communicate with each other.

4. Apparatus according to claim 3, characterized in that the two folding bellows have approximately the same diameter.

5. Apparatus according to claim 3, characterized in that the spring means are disposed within one folding bellows.

6. Apparatus according to claim 3, characterized in that that end of the buffer which cooperates with the carriage is formed by a tube, which has air passage holes and is guided in a tubular guide and carries a buffer plate and at its end remote from the buffer plate is connected by a rod to an end plate of the second folding bellows.

7. Apparatus according to claim 1, characterized in that the spring means are deformed to an extent which is at least 1/25 and preferably at least 1/20 of the width over which the solids are to be distributed.

8. Apparatus according to claim 1, characterized in that the spring means includes a coil spring.

9. In apparatus for distributing solids in granular or lump form over an area of defined width comprising a wheeled carriage which is reciprocal between two end positions along a path which corresponds to said width, said carriage carrying a longitudinally extending endless conveyor which is charged with the solids to be distributed and which has a discharge end that moves above said width during movement of said carriage, the improvement which comprises an elastically deformable energy storage and release device for limiting the movement of said carriage at each end of the path of movement of said carriage thereby absorbing energy from said carriage and for thereafter transferring energy back to said carriage to move the latter in an opposite direction, said device in its deformed position defining the respective end position of said carriage.

10. Apparatus as in claim 9 wherein said energy storage and release device includes inner and outer telescopically arranged tube means biased toward an extended position by a coil spring.

11. Apparatus as in claim 10 including a folding bellows connected between each end of the inner tube means and the respective end of the outer tube means, the interiors of said bellows communicating with each other through said tube means.

* * * * *